United States Patent
Aikawa et al.

(10) Patent No.: US 11,378,133 B2
(45) Date of Patent: Jul. 5, 2022

(54) DAMPER DEVICE

(71) Applicant: EXEDY Corporation, Neyagawa (JP)

(72) Inventors: Masataka Aikawa, Neyagawa (JP); Hiroki Matsuo, Neyagawa (JP)

(73) Assignee: EXEDY CORPORATION, Neyagawa (JP)

( * ) Notice: Subject to any disclaimer, the term of this patent is extended or adjusted under 35 U.S.C. 154(b) by 346 days.

(21) Appl. No.: 16/695,585

(22) Filed: Nov. 26, 2019

(65) Prior Publication Data

US 2020/0271166 A1 Aug. 27, 2020

(30) Foreign Application Priority Data

Feb. 22, 2019 (JP) .............................. JP2019-030251

(51) Int. Cl.
*F16D 3/12* (2006.01)
*F16F 15/123* (2006.01)

(52) U.S. Cl.
CPC .............. *F16D 3/12* (2013.01); *F16F 15/123* (2013.01); *F16F 15/12326* (2013.01); *F16F 15/1234* (2013.01)

(58) Field of Classification Search
CPC ..... F16D 3/12; F16F 15/123; F16F 15/12326; F16F 15/1234

(Continued)

(56) References Cited

U.S. PATENT DOCUMENTS 4,148,200 A * 4/1979 Schallhorn ................ F16D 3/64
464/68.3
5,377,560 A * 1/1995 Schierling ......... F16F 15/13438
464/68.92

(Continued)

FOREIGN PATENT DOCUMENTS

EP 3321538 A1 5/2018
EP 3543559 A1 9/2019

(Continued)

OTHER PUBLICATIONS

Extended European Search Report dated Jun. 22, 2020 for corresponding European Application No. 20151999.8, 8 pp.

*Primary Examiner* — Greg Binda
(74) *Attorney, Agent, or Firm* — United IP Counselors, LLC

(57) ABSTRACT

A damper device includes first and second rotary members, elastic members, and seat members. The first rotary member includes an annular chamber, and first engaging portions provided in the annular chamber. The second rotary member includes a second engaging portion. The elastic members are aligned in a circumferential direction in the annular chamber, and elastically couple the first and second rotary members in a rotational direction. Each seat member is disposed between a circumferential end surface of each elastic member and both the first engaging portions and the second engaging portion. Each seat member includes first and second contact surfaces. The first contact surface contacts the circumferential end surface of each elastic member. The second contact surface contacts the second engaging portion. The first and second contact surfaces tilt at angles to prevent a radially outward force from acting on each seat member when each elastic member is elastically deformed.

7 Claims, 6 Drawing Sheets

(58) Field of Classification Search
USPC .............................. 464/68.3, 68.92; 192/205
See application file for complete search history.

(56) References Cited

U.S. PATENT DOCUMENTS 6,471,593 B1 * 10/2002 Hanke ..................... F16F 15/10
                                                                           464/68.3
8,469,825 B2 * 6/2013 Banfi ........................ F16D 3/66
                                                                           464/68.92

FOREIGN PATENT DOCUMENTS

FR           2599800 A1   12/1987
JP        2015-086965 A   5/2015

* cited by examiner

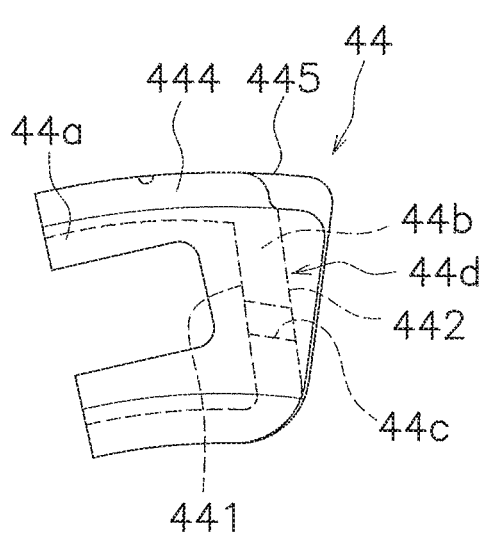 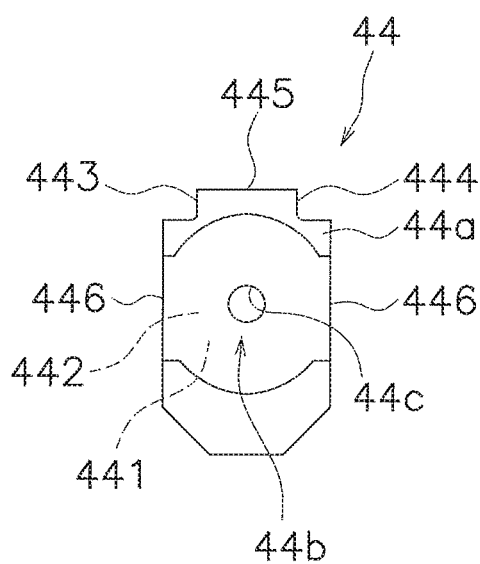
FIG. 4A  FIG. 4B
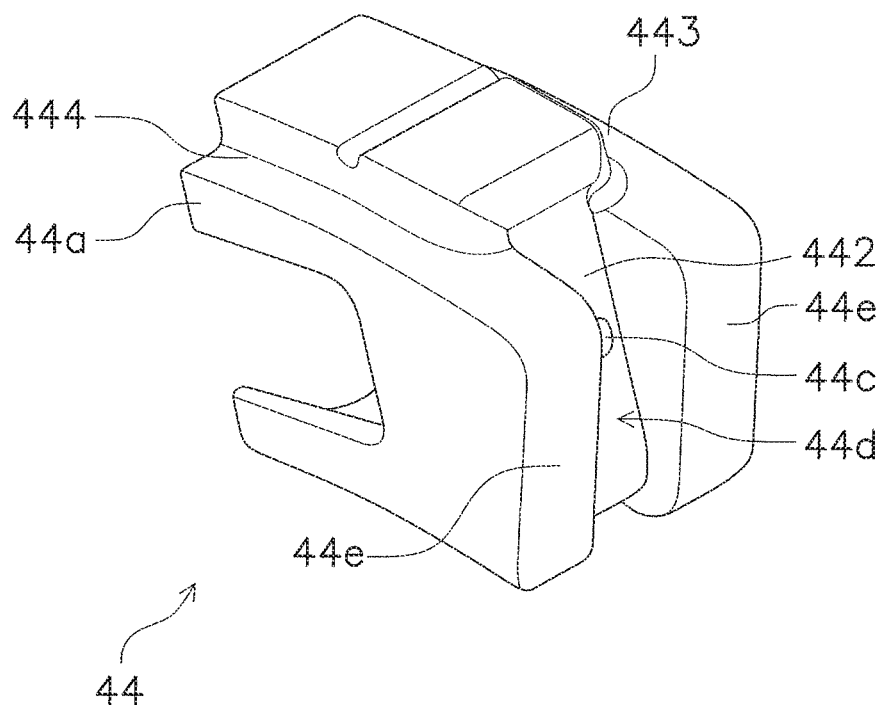
FIG. 5

PRIOR ART

DAMPER DEVICE

CROSS-REFERENCE TO RELATED APPLICATIONS

This application claims priority to Japanese Patent Application No. 2019-030251, filed Feb. 22, 2019. The contents of that application are incorporated by reference herein in their entirety.

TECHNICAL FIELD

The present invention relates to a damper device.

BACKGROUND ART

A damper device is embedded in a drivetrain for a vehicle in order to transmit power inputted thereto from an engine and attenuate fluctuations in rotation inputted thereto. Such a flywheel assembly as described in Japan Laid-open Patent Application Publication No. 2015-86965 has been proposed as this type of damper device.

The flywheel assembly described in Japan Laid-open Patent Application Publication No. 2015-86965 includes a first flywheel and a second flywheel. The first flywheel is a member to which the power of the engine is inputted. The second flywheel includes a driven plate, and is disposed to be rotatable with respect to the first flywheel. The first and second flywheels are elastically coupled in a rotational direction by a plurality of springs. Additionally, end seats are disposed such that each is interposed between the spring adjacent thereto and both the first flywheel and the driven plate, while intermediate seats are disposed such that each is interposed between adjacent two of the springs.

In the flywheel assembly, an annular chamber is formed by the first flywheel. Viscous fluid such as grease is filled in the annular chamber. Additionally, rotational vibration is attenuated by resistance of the viscous fluid in relative rotation between the first flywheel and the second flywheel.

In the flywheel assembly described in Japan Laid-open Patent Application Publication No. 2015-86965, the springs are compressed through the end seats in the relative rotation between the first flywheel and the second flywheel. Besides, with compression and extension of the springs, each seat is circumferentially slid along the inner wall of an outer peripheral part of the annular chamber. At this time, each end seat is pressed at one circumferential surface thereof by the driven plate, while being pressed at the other circumferential surface thereof by the spring adjacent thereto. Therefore, a radially outward force is configured to act on each end seat as a net force of the pressing forces applied thereto. In other words, the outer peripheral surface of each end seat is pressed onto the inner wall of the annular chamber. This results in drawbacks of increase in hysteresis torque, elevation in equivalent stiffness during actuation, and degradation in vibration attenuation performance.

BRIEF SUMMARY

It is an object of the present invention to lessen a hysteresis torque attributed to sliding of a seat member and enhance vibration attenuation performance.

(1) A damper device according to the present invention includes a first rotary member, a second rotary member, a plurality of elastic members and a plurality of seat members. The first rotary member includes an annular chamber and a plurality of first engaging portions. The annular chamber includes an outer peripheral wall. The plurality of first engaging portions are provided in an interior of the annular chamber. The second rotary member is rotatable relative to the first rotary member, and includes a second engaging portion that enters the annular chamber. The plurality of elastic members are disposed in alignment in a circumferential direction in the interior of the annular chamber, and elastically couple the first rotary member and the second rotary member in a rotational direction. The plurality of seat members are movable along the outer peripheral wall of the annular chamber, and each of the plurality of seat members is disposed between a circumferential end surface of each of the plurality of elastic members and both the first engaging portions and the second engaging portion. The each of the plurality of seat members includes a first contact surface and a second contact surface. The first contact surface makes contact with the circumferential end surface of the each of the plurality of elastic members. The second contact surface makes contact with the second engaging portion.

Additionally, the first and second contact surfaces tilt at angles such that a radially outward force is prevented from being generated to act on the each of the plurality of seat members when the each of the plurality of elastic members is elastically deformed.

In the present device, for instance, power inputted to the first rotary member is transmitted to the second rotary member through the elastic members. When the elastic members are compressed through the seat members in transmission of the power, the second rotary member is displaced relative to the first rotary member. In the damper actuation described above, a pressing force applied from each elastic member acts on the first contact surface of each seat member, while a pressing force applied from the second engaging portion acts on the second contact surface of each seat member. In the situation described above, the first and second contact surfaces tilt at predetermined angles, whereby the radially outward force is not generated to act on each seat member when each elastic member is elastically deformed.

Here, the radially outward force is not generated to act on each seat member in the damper actuation. Hence, each seat member is not pressed onto the outer peripheral wall of the annular chamber. Because of this, it is possible to lessen a hysteresis torque to be generated when each seat member is moved along the outer peripheral wall of the annular chamber. Therefore, damper vibration attenuation performance can be enhanced.

(2) Preferably, the first and second contact surfaces of the each of the plurality of seat members are parallel to each other. With the configuration described above, the pressing forces acting on the first and second contact surfaces are canceled out, whereby the radially outward force, i.e., a force directed toward the outer peripheral wall of the annular chamber, can be prevented from being generated to act on each seat member.

(3) Preferably, the first and second contact surfaces of the each of the plurality of seat members tilt radially outward to be angled with respect to given one of straight lines radially extending from a rotational center of the first and second rotary members.

(4) Preferably, the second contact surface of the each of the plurality of seat members is a bottom surface of a groove provided on an axial middle part of the each of the plurality of seat members with a predetermined width. Additionally, the second engaging portion is inserted at a circumferential end thereof into the groove. Moreover, the each of the plurality of seat members further includes large thickness portions, protruding in the circumferential direction, on both axial sides of the second contact surface.

The second rotary member is herein inserted at the second engaging portion into the groove of each seat member. Hence, each seat member can be inhibited from wobbling in the axial direction, whereby each seat member is stabilized in posture. Additionally, the large thickness portions are provided on the both sides of the groove on each seat member, whereby each seat member is enabled to reliably have sufficient strength.

(5) Preferably, the annular chamber contains a viscous fluid in the interior thereof. Additionally, the each of the plurality of seat members includes a communicating groove penetrating therethrough in the circumferential direction.

According to the present device, in the damper actuation, the viscous fluid residing between the seat members moves to a gap between the first rotary member and the second rotary member, specifically, a gap between one rotary member and the engaging portion of the other rotary member. The viscous fluid accumulated in the gap flows out through the communicating groove provided on each seat member.

It is herein possible to avoid a situation that in the damper actuation, viscous resistance attributed to the viscous fluid increases and exceeds a magnitude preliminarily set to be exerted by the viscous fluid. Therefore, degradation in damper vibration attenuation performance can be inhibited.

(6) Preferably, the communicating groove is provided on at least one of two corners at which an outer peripheral surface and lateral surfaces intersect in the each of the plurality of seat members.

The communicating groove is herein provided on at least one of the corners on the outer periphery of each seat member. Hence, each elastic member received by each seat member can be designed to have a large outer diameter. Additionally, the second engaging portion of the second rotary member is engaged with an axially middle part of each seat member. Therefore, the structure of the communicating groove provided on at least one of the corners on the outer periphery of each seat member can prevent the second engaging portion from closing the communicating groove.

(7) Preferably, the first rotary member includes a pair of disc-shaped members disposed in opposition to each other in an axial direction. Additionally, the second rotary member is disposed between the pair of disc-shaped members in the axial direction.

Overall, according to the present invention described above, a hysteresis torque attributed to sliding of a seat member can be lessened, and vibration attenuation performance can be enhanced.

BRIEF DESCRIPTION OF THE DRAWINGS

FIGS. 4A and 4B are diagrams including a front view and a side view of an end spring seat.

FIG. 5 is an external perspective view of the end spring seat.

DETAILED DESCRIPTION

[Entire Configuration]

Figure 1:
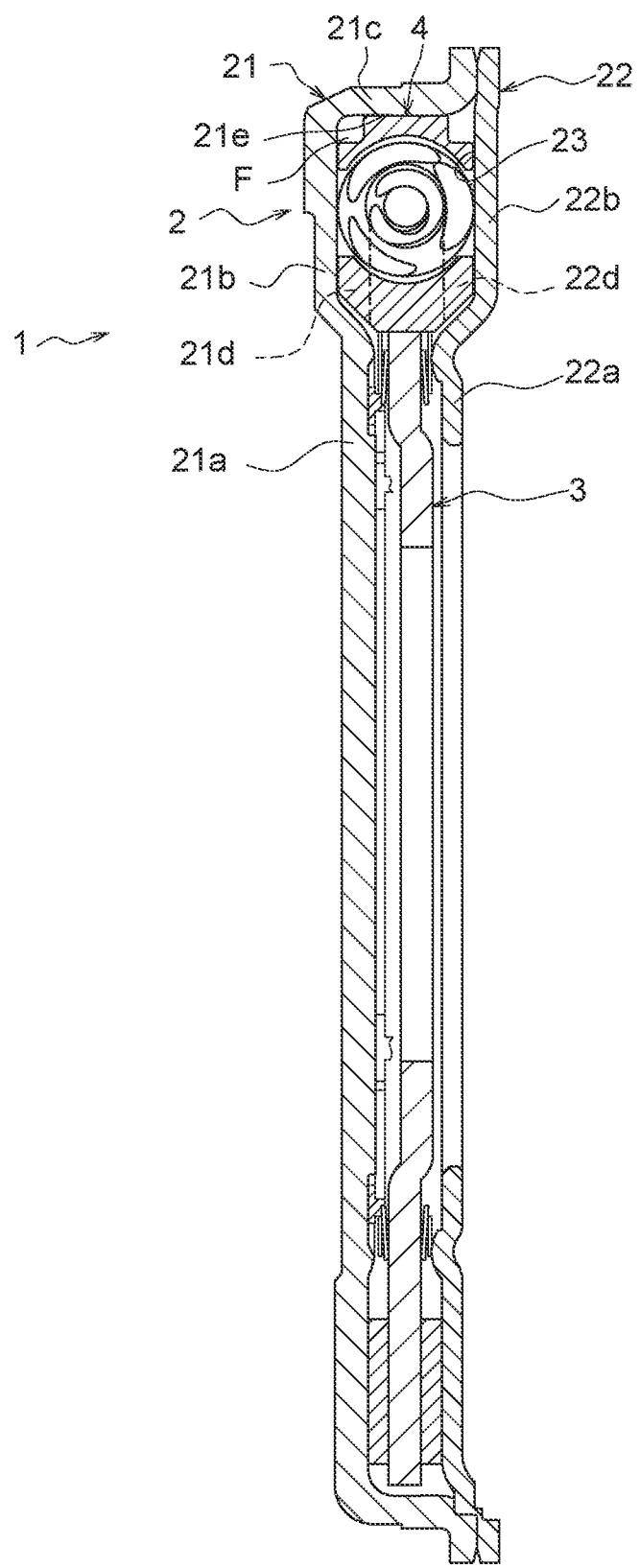
FIG. 1 is a cross-sectional view of a damper device according to a preferred embodiment of the present invention.
Figure 2:
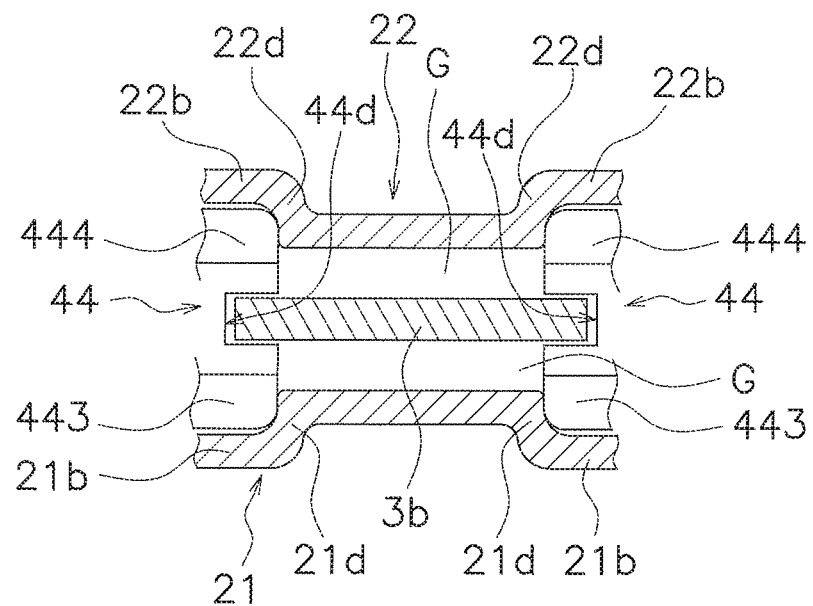
FIG. 2 is a cross-sectional plan view of part of the damper device.
Figure 3:
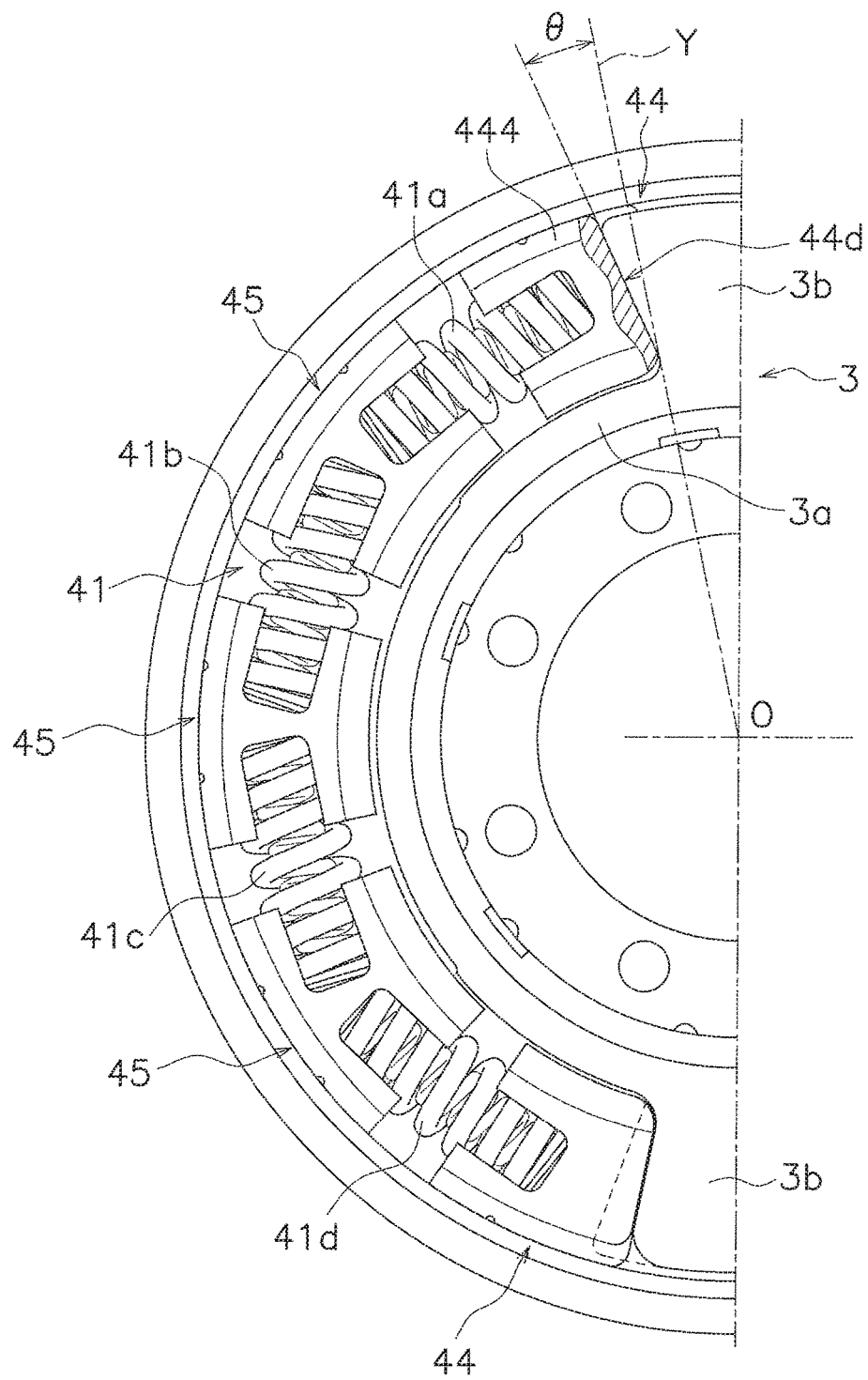
FIG. 3 is a front view of part of the damper device shown in FIG. 1.

FIG. 1 shows a cross-sectional configuration of a damper device 1, whereas FIG. 2 is a cross-sectional plan view of part of the damper device 1. Additionally, FIG. 3 is a front view of part of the damper device 1.

The damper device 1 is a device for transmitting power generated in an engine toward a transmission. The damper device 1 includes an input-side rotary member 2 (exemplary first rotary member), an output plate 3 (exemplary second rotary member) and a damper mechanism 4.

[Input-Side Rotary Member 2]

The input-side rotary member 2 is a member to which the power generated in the engine is inputted. The input-side rotary member 2 is supported by and coupled to an engine-side member (not shown in the drawings). The input-side rotary member 2 includes a first plate 21 and a second plate 22.

The first plate 21 includes a first plate body 21a having a disc shape, two first lateral portions 21b, and a tubular portion 21c extending in an axial direction from the outer peripheral part of the first plate body 21a and that of each first lateral portion 21b. It should be noted that the inner peripheral-side surface of the tubular portion 21c functions as an outer peripheral wall 21e, and seats (to be described) are each slid along the outer peripheral wall 21e.

Outer peripheral portions 21d of the first plate body 21a are rotation-directional ends of the first lateral portions 21b, and function as first engaging portions. In other words, as shown in FIG. 2, the outer peripheral portions 21d (first engaging portions) of the first plate body 21a are capable of being rotation-directionally engaged with end spring seats 44 (to be described; exemplary seat members), respectively.

The first lateral portions 21b are portions bulging toward the engine than the first plate body 21a and are shaped by, for instance, stamping. The two first lateral portions 21b are disposed at equal pitches in a circumferential direction. Each first lateral portion 21b is provided in a range corresponding to four springs (to be described).

The second plate 22 is an annular member fixed to the tubular portion 21c, and includes a second plate body 22a having a disc shape and two second lateral portions 22b.

Outer peripheral portions 22d of the second plate body 22a are rotation-directional ends of the second lateral portions 22b, and function as the first engaging portions similarly to the outer peripheral portions 21d of the first plate 21. In other words, as shown in FIG. 2, the outer peripheral portions 22d (first engaging portions) of the second plate body 22a are capable of being rotation-directionally engaged with the end spring seats 44, respectively.

As described above, the first engaging portions 21d of the first plate body 21a and the first engaging portions 22d of the second plate body 22a are capable of being engaged with one-side circumferential ends of the end spring seats 44, respectively.

The second lateral portions 22b are portions bulging toward the transmission than the second plate body 22a and are shaped by, for instance, stamping. The two second lateral portions 22b are disposed at equal pitches in the circumferential direction. Each second lateral portion 22b is provided in the range corresponding to four springs.

As described above, the first plate 21 and the second plate 22 are disposed in opposition to each other at an interval in the axial direction, whereby an annular chamber 23 is formed between the both plates 21 and 22. The annular chamber 23 is filled with viscous fluid F such as grease or so forth. Besides, the second lateral portions 22b are disposed in opposition to the first lateral portions 21b in the outer peripheral part of the input-side rotary member 2, whereby a relatively wide space can be formed for disposing the springs.

[Output Plate 3]

The output plate 3 is disposed to be rotatable with respect to the input-side rotary member 2. The output plate 3 is supported by and coupled to a transmission-side member (not shown in the drawings).

As shown in FIG. 3, the output plate 3 is an annular member, and includes a body 3a and two second engaging portions 3b protruding from the outer periphery of the body 3a to the further outer peripheral side. The two second engaging portions 3b are disposed in radially opposed positions. Each of the both circumferential end surfaces of each second engaging portion 3b tilts radially outward to be angled at an angle θ with respect to given one of straight lines Y radially extending from a rotational center O of both the input-side rotary member 2 and the output plate 3.

The output plate 3 is disposed between the first and second plates 21 and 22 of the input-side rotary member 2 in the axial direction. In other words, the outer peripheral part of the output plate 3 is disposed in the interior of the annular chamber 23. Additionally, the second engaging portions 3b enter the annular chamber 23 and make contact with the end spring seats 44. The power generated in the engine is transmitted to the output plate 3 through the damper mechanism 4.

[Damper Mechanism 4]

The damper mechanism 4 is a mechanism elastically coupling the input-side rotary member 2 and the output plate 3 in the rotational direction. The damper mechanism 4 includes two sets of torsion springs 41 (exemplary elastic members), four end spring seats 44 and six intermediate spring seats 45. Each set of torsion springs 41 is disposed between two triads of the engaging portions 21d, 22d and 3b.

Each set of torsion springs 41 is composed of first to fourth springs 41a, 41b, 41c and 41d disposed in alignment in the circumferential direction. These springs 41a to 41d act in series between the input-side rotary member 2 and the output plate 3.

The end spring seats 44 rotation-directionally make contact with the first engaging portions 21d and 22d of the input-side rotary member 2 in a neutral state that power is not being transmitted to the present device 1. Additionally, the end spring seats 44 are capable of making contact with the second engaging portions 3b of the output plate 3.

All the four end spring seats 44 have the same shape. As shown in FIGS. 3 to 5, each end spring seat 44 is made in the shape of a tube including openings in part of the both axial sides thereof. Each end spring seat 44 includes a tubular portion 44a and a bottom portion 44b. The tubular portion 44a is circumferentially opened to one side (the opposite side from the bottom portion 44b). An end portion of each first or fourth spring 41a, 41d is inserted into the tubular portion 44a. Moreover, the end portion of each first or fourth spring 41a, 41d makes contact at the distal end thereof with a bottom surface 441 of the bottom portion 44b. In other words, the bottom surface 441 is provided as a first contact surface with which the end surface of each first or fourth spring 41a, 41d makes contact. Furthermore, the bottom portion 44b is provided with a discharge hole 44c circumferentially penetrating therethrough.

Additionally, as shown in FIG. 5, the bottom portion 44b is provided with a groove 44d on the circumferentially outer surface thereof. Moreover, each of the both ends of each second engaging portion 3b of the output plate 3 is inserted into the groove 44d, and is capable of making contact at the circumferential end surface thereof with a bottom surface 442 of the groove 44d. In other words, the bottom surface 442 of the groove 44d is provided as a second contact surface with which each end surface of each second engaging portion 3b makes contact. Similarly to each second engaging portion 3b, the second contact surface 442 tilts radially outward to be angled with respect to given one of the straight lines Y radially extending from the rotational center O. The first and second contact surfaces 441 and 442 are herein parallel to each other.

As is obvious from FIG. 5, each end spring seat 44 includes large thickness portions 44e on the both axial sides of the groove 44d. The large thickness portions 44e extend from the groove 44d in the circumferential direction, and each have a large thickness in the circumferential direction.

With the configuration described above, each end spring seat 44 supports the end portion of each first or fourth spring 41a, 41d in both radial and axial directions.

Each end spring seat 44 is provided with communicating grooves 443 and 444 on the both axial corners of the outer peripheral part thereof. Each communicating groove 443, 444 penetrates therethrough in the circumferential direction. Specifically, each end spring seat 44 is provided with the communicating grooves 443 and 444 on two corners at which an outer peripheral surface 445 and lateral surfaces 446 intersect. In other words, each communicating groove 443, 444 is opened to the outer peripheral side and one axial side. Additionally, each communicating groove 443, 444 penetrates each end spring seat 44 from one side to the other side in the rotational direction.

It should be noted that the cross section of each communicating groove 443, 444 is not limited to a particular shape. The cross section of each communicating groove 443, 444 can be made in any of a variety of shapes including a rectangle, a circular arc and so forth.

All the six intermediate spring seats 45 have the same shape. Each intermediate spring seat 45 is disposed between adjacent two of the torsion springs 41. Specifically, the intermediate spring seats 45 are disposed between the first spring 41a and the second spring 41b, between the second spring 41b and the third spring 41c, and between the third spring 41c and the fourth spring 41d, respectively.

Figure 6A:
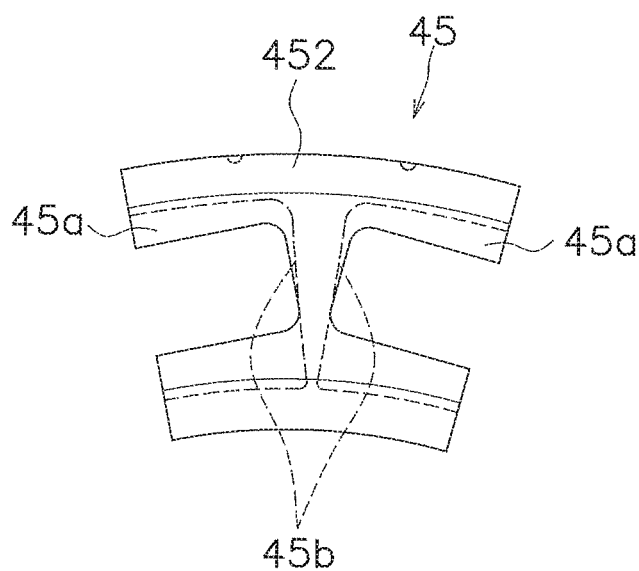
FIGS. 6A and 6B are diagrams including a front view and a side view of an intermediate spring seat.
Figure 6B:
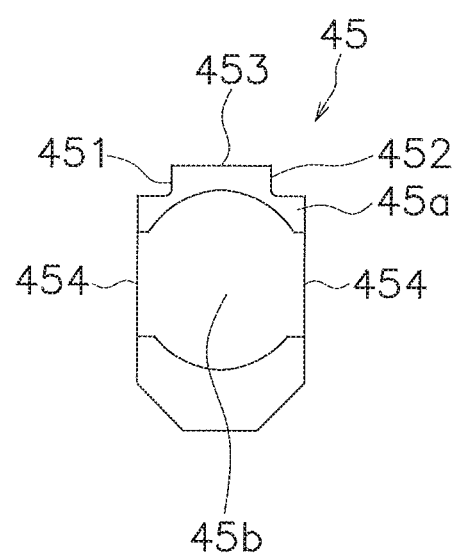

As shown in FIGS. 3 and 6, each intermediate spring seat 45 is made in the shape of a tube including openings in part of the both axial sides thereof. Each intermediate spring seat 45 includes two tubular portions 45a and bottom portions 45b provided in the two tubular portions 45a, respectively. Each tubular portion 45a is circumferentially opened to one side (the opposite side from the bottom portion 45b). Additionally, end portions of the first to third springs 41a, 41b and 41c are inserted into one-side tubular portions 45a of the three intermediate spring seats 45. The distal ends of the end portions of the first to third springs 41a, 41b and 41c make contact with the bottom portions 45b of the one-side tubular portions 45a, respectively. End portions of the second to fourth springs 41b, 41c and 41d are inserted into the other-side tubular portions 45a of the three intermediate spring seats 45. The distal ends of the end portions of the second to fourth springs 41b, 41c and 41d make contact with the bottom portions 45b of the other-side tubular portions 45a, respectively.

With the configuration described above, adjacent two of the first to fourth springs 41a, 41b, 41c and 41d are supported at the end portions thereof by each intermediate spring seat 45 in both radial and axial directions.

Each intermediate spring seat 45 is provided with communicating grooves 451 and 452 on the both axial corners of the outer peripheral part thereof. Each communicating groove 451, 452 penetrates therethrough in the circumferential direction. Specifically, each intermediate spring seat 45 is provided with the communicating grooves 451 and 452 on two corners at which an outer peripheral surface 453 and lateral surfaces 454 intersect. In other words, each communicating groove 451, 452 is opened to the outer peripheral side and one axial side. Additionally, each communicating groove 451, 452 penetrates each intermediate spring seat 45 from one side to the other side in the rotational direction.

It should be noted that similarly to the configuration of each end spring seat 44, the cross-section of each communicating groove 451, 452 is not limited to a particular shape. The cross section of each communicating groove 451, 452 can be made in any of a variety of shapes including a rectangle, a circular arc and so forth.

Additionally, the communicating grooves 443 and 444 of each end spring seat 44 and the communicating grooves 451 and 452 of each intermediate spring seat 45 are provided in radially identical positions. In other words, the communicating grooves 443, 444, 451 and 452 are disposed on the circumference of a common circle.

[Seal Mechanism 50]

A seal mechanism 50 is provided between the output plate 3 (specifically, the body 3a) and both the first plate 21 and the second plate 22 so as to prevent the viscous fluid filled in the annular chamber 23 from flowing out therefrom.

Figure 7:
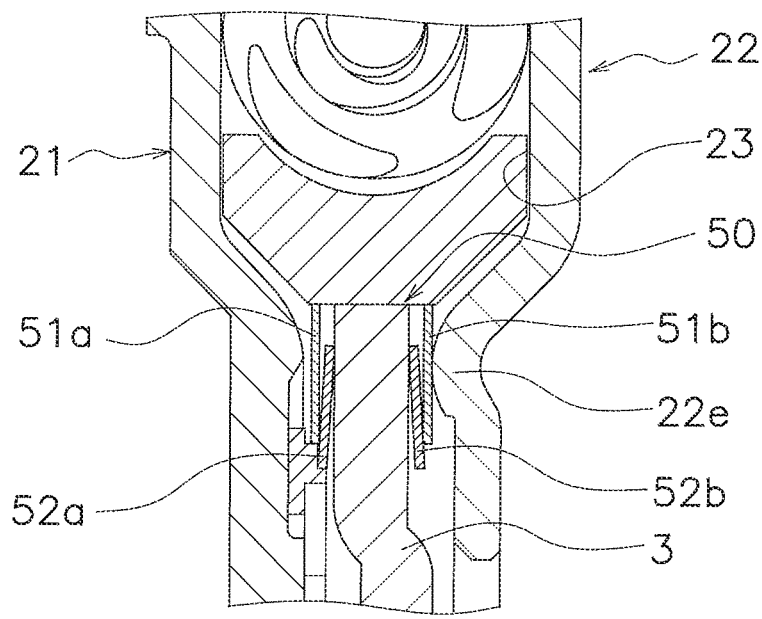
FIG. 7 is an enlarged view of part of FIG. 1.

As shown in FIG. 7, which is an enlarged view of part of FIG. 1, the seal mechanism 50 is provided in the inner peripheral part of the annular chamber 23, and includes seal members 51a and 51b, each of which has an annular shape, and cone springs 52a and 52b, each of which has an annular shape. Specifically, the seal member 51a and the cone spring 52a are disposed between a radially intermediate part of the first plate 21 and the output plate 3, while being aligned in this order from the first plate 21 side. Additionally, the second plate 22 is provided with an annular protruding portion 22e, protruding toward the first plate 21, on an inner peripheral part thereof. The seal member 51b and the cone spring 52b are disposed between the annular protruding portion 22e and the output plate 3, while being aligned in this order from the second plate 22 side.

With the configuration described above, each seal member 51a, 51b is pressed onto each cone spring 52a, 52b (and further onto the output plate 3) and each first/second plate 21, 22, whereby the inner peripheral part of the annular chamber 23 is sealed.

[Action]

In the neutral state that power is not being inputted to the input-side rotary member 2, the torsion springs 41 are not being compressed, and relative rotation (torsion) does not occur between the input-side rotary member 2 and the output plate 3.

When power is inputted to the input-side rotary member 2, the torsion springs 41 are compressed in accordance with the magnitude of power, and torsion occurs between the input-side rotary member 2 and the output plate 3. Additionally in this state, the power is transmitted from the input-side rotary member 2 to the output plate 3 through the torsion springs 41. Moreover, the torsion springs 41 are repeatedly compressed and extended in accordance with rotational vibration.

In damper actuation described above, the end spring seats 44 and the intermediate spring seats 45 slide inside the annular chamber 23, whereby slide resistance occurs. On the other hand, the viscous fluid flows from one side of each spring seat 44, 45 to the other side thereof, whereby viscous resistance occurs. A hysteresis torque occurs due to these resistances, whereby rotational vibration is inhibited.

Figure 8:
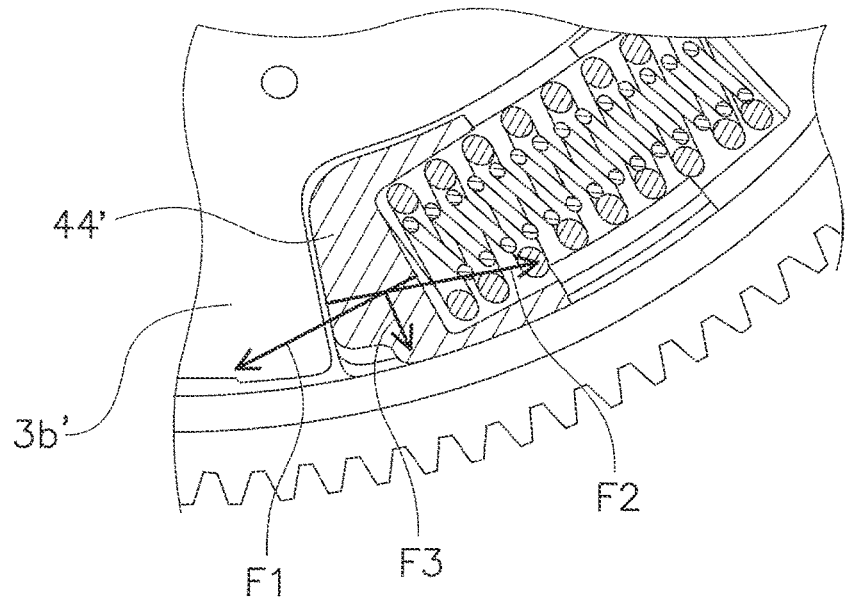
FIG. 8 is a diagram showing a relation between the end spring seat and an engaging portion according to a well-known art.

Now, in such a well-known structure of an engaging portion 3b' of an output plate and an end spring seat 44' as shown in FIG. 8, in damper actuation, the end spring seat 44' receives a pressing force F1 applied from a torsion spring, and receives a pressing force F2 applied from the engaging portion 3b' of the output plate. The end spring seat 44' is herein pressed radially outward, i.e., onto the wall of an annular chamber, by a net force F3 of the pressing forces F1 and F2. Slide resistance of the end spring seat 44' is increased by the net force F3, whereby a hysteresis torque is increased.

Figure 9:
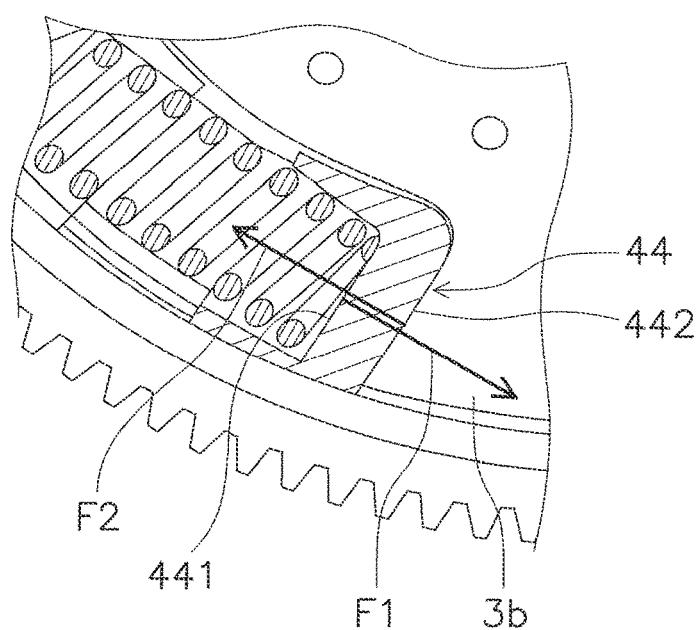
FIG. 9 is a diagram showing a relation between the end spring seat and the engaging portion according to the preferred embodiment of the present invention.

By contrast, according to the structure in the present preferred embodiment, the first and second contact surfaces 441 and 442 are shaped in parallel to each other as shown in FIG. 9. Because of this, the pressing force F1 applied to the end spring seat 44 from the torsion spring and the pressing force F2 applied to the end spring seat 44 from the second engaging portion 3b are canceled out, whereby the force, by which the end spring seat 44 is pressed onto the outer peripheral wall of the annular chamber 23, has a magnitude of "0". Because of this, the hysteresis torque attributed to sliding of the end spring seat 44 can be lessened, and vibration attenuation performance can be enhanced in comparison with the well-known structure.

Besides in damper actuation, as shown in FIG. 2, the viscous fluid flows into gaps G between the first and second plates 21 and 22 and the second engaging portions 3b of the output plate 3. Now, it is assumed that each end spring seat 44 is not provided with the communicating grooves 443 and 444. In this assumption, the viscous fluid, when flowing into the gaps G, is accumulated therein because each end spring seat 44 functions as a partition. Consequently, a hysteresis torque occurs due to unintended viscous resistance through the entire ranges of damper actuation.

By contrast, in the present preferred embodiment, each end spring seat 44 is provided with the communicating grooves 443 and 444. Hence, the viscous fluid, when flowing into the gaps G, smoothly flows out therefrom through the communicating grooves 443 and 444. Additionally, the viscous fluid in the gaps G flows out therefrom through the discharge hole 44c of each end spring seat 44 to a space in which the torsion spring 41 is disposed.

Especially, the viscous fluid residing inside the annular chamber 23 receives forces directed to the outer peripheral side. Therefore, the viscous fluid becomes likely to be evenly distributed in a circumferential shape through the communicating grooves 443 and 444 provided on the outer peripheral part of each end spring seat 44 and the communicating grooves 451 and 452 provided on the outer peripheral part of each intermediate spring seat 45. Because of this, it is possible to inhibit occurrence of a large hysteresis torque exceeding a hysteresis torque planned to occur due to the viscous fluid.

Other Preferred Embodiments

The present invention is not limited to the preferred embodiment described above, and a variety of changes or modifications can be made without departing from the scope of the present invention.

(a) In the aforementioned preferred embodiment, the first and second contact surfaces 441 and 442 are shaped in parallel to each other. However, the angle formed between the both contact surfaces can be set such that the net force of the pressing force F1 applied to each end spring seat 44 from the torsion spring and the pressing force F2 applied to each end spring seat 44 from each second engaging portion 3b is directed radially inward.

(b) The number and shape of the end spring seats and those of the intermediate spring seats are not limited to those in the aforementioned preferred embodiment.

(c) The aforementioned preferred embodiment has explained the configuration that the input-side rotary member is supported by the engine-side member whereas the output plate is supported by the transmission-side member. However, the configuration for each rotary member is not limited to the above. For example, the present invention is similarly applicable as well to such a configuration that the input-side rotary member is rotatably supported by the output plate.

REFERENCE SIGNS LIST

2 Input-side rotary member (first rotary member)
21 First plate
22 Second plate
21d, 22d Outer peripheral portion (first engaging portion)
21e Outer peripheral wall
23 Annular chamber
3 Output plate (second rotary member)
3b Second engaging portion
41 Torsion Spring (elastic member)
44 End spring seat (seat member)
441 Bottom surface (first contact surface)
442 Bottom surface (second contact surface)
443, 444 Communicating groove
44e Large thickness portion

What is claimed is:

1. A damper device comprising:
a first rotary member including an annular chamber and a plurality of first engaging portions, the annular chamber including an outer peripheral wall, the plurality of first engaging portions provided in an interior of the annular chamber;
a second rotary member rotatable relative to the first rotary member, the second rotary member including a second engaging portion, the second engaging portion entering the annular chamber;
a plurality of elastic members disposed in alignment in a circumferential direction in the interior of the annular chamber, the plurality of elastic members elastically coupling the first rotary member and the second rotary member in a rotational direction; and
a plurality of seat members movable along the outer peripheral wall of the annular chamber, each of the plurality of seat members disposed between a circumferential end surface of each of the plurality of elastic members and both the first engaging portions and the second engaging portion, each of the plurality of seat members including a first contact surface and a second contact surface, the first contact surface making contact with the circumferential end surface of each of the plurality of elastic members, the second contact surface making contact with the second engaging portion, wherein
the first and second contact surfaces tilt at angles such that a radially outward force is prevented from being generated to act on each of the plurality of seat members when each of the plurality of elastic members is elastically deformed, and
the second contact surface of each of the plurality of seat members is a bottom surface of a groove provided on an axial middle part of each of the plurality of seat members with a predetermined width.

2. The damper device according to claim 1, wherein the first and second contact surfaces of each of the plurality of seat members are parallel to each other.

3. The damper device according to claim 2, wherein the first and second contact surfaces of each of the plurality of seat members tilt radially outward to be angled with respect to given one of straight lines radially extending from a rotational center of the first and second rotary members.

4. The damper device according to claim 1, wherein
the second engaging portion is inserted at a circumferential end thereof into the groove, and
each of the plurality of seat members further includes large thickness portions on both axial sides of the second contact surface, the large thickness portions protruding in the circumferential direction.

5. The damper device according to claim 1, wherein the annular chamber contains a viscous fluid in the interior thereof, and each of the plurality of seat members including a communicating groove penetrating therethrough in the circumferential direction.

6. The damper device according to claim 5, wherein the communicating groove is provided on at least one of two corners at which an outer peripheral surface and lateral surfaces intersect in each of the plurality of seat members.

7. The damper device according to claim 1, wherein
the first rotary member includes a pair of disc-shaped members opposed to each other in an axial direction, and
the second rotary member is disposed between the pair of disc-shaped members in the axial direction.

* * * * *